United States Patent
Guzman et al.

(10) Patent No.: US 11,534,634 B2
(45) Date of Patent: Dec. 27, 2022

(54) BRAKE ASSEMBLY FOR FALL ARREST SYSTEM

(71) Applicant: Honeywell International Inc., Morris Plains, NJ (US)

(72) Inventors: Luis Adolfo Guzman, Tijuana (MX); Fatima Sierra, San Luis Potosi (MX); Ross Balquist, Slippery Rock, PA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 342 days.

(21) Appl. No.: 16/840,034

(22) Filed: Apr. 3, 2020

(65) Prior Publication Data

US 2021/0308503 A1    Oct. 7, 2021

(51) Int. Cl.
| | |
|---|---|
| A62B 35/04 | (2006.01) |
| F16D 59/00 | (2006.01) |
| F16D 63/00 | (2006.01) |
| F16F 7/00 | (2006.01) |
| F16F 7/12 | (2006.01) |
| A62B 35/00 | (2006.01) |

(52) U.S. Cl.
CPC .............. *A62B 35/04* (2013.01); *F16D 59/00* (2013.01); *F16D 63/006* (2013.01); *F16F 7/003* (2013.01); *F16F 7/12* (2013.01); *A62B 35/0093* (2013.01)

(58) Field of Classification Search
CPC ........ A62B 35/04; A62B 35/0093; A62B 1/10
See application file for complete search history.

(56) References Cited

U.S. PATENT DOCUMENTS

| | | | |
|---|---|---|---|
| 7,870,934 B2 | 1/2011 | Ecker | |
| 9,121,462 B2* | 9/2015 | Casebolt | A62B 35/0093 |
| 10,020,720 B2* | 7/2018 | Diehl | B60T 1/005 |
| 2005/0051659 A1 | 3/2005 | Wolner et al. | |
| 2007/0151805 A1 | 7/2007 | Betcher et al. | |
| 2011/0209948 A1* | 9/2011 | Auston | B65H 75/28 |
| | | | 188/68 |
| 2018/0169446 A1 | 6/2018 | Griffiths et al. | |
| 2019/0126079 A1 | 5/2019 | Svoboda et al. | |
| 2019/0247683 A1 | 8/2019 | Farrell | |

FOREIGN PATENT DOCUMENTS

| | | | |
|---|---|---|---|
| AU | 2010336378 B2 | 10/2013 | |
| CA | 2711958 C | 5/2016 | |
| CN | 110523019 A * | 12/2019 | |
| JP | H067470 A * | 1/1994 | |
| KR | 10-1376047 B1 | 3/2014 | |
| WO | WO-2020201700 A1 * | 10/2020 | A62B 35/0093 |

OTHER PUBLICATIONS

Extended European search report dated Sep. 28, 2021 for EP Application No. 21163512, 6 pages.

* cited by examiner

*Primary Examiner* — Melanie Torres Williams
(74) *Attorney, Agent, or Firm* — Alston & Bird LLP

(57) ABSTRACT

A brake plate of a fall arrest system is provided for protecting users during a fall. The brake plate comprises a body having a central opening. The central opening defines an inner circumference of the body. The brake plate comprises a plurality of ratchet gear teeth disposed along the inner circumference of the body. Further, the brake plate comprises at least two slots on the body, wherein the at least two slots are disposed diametrically opposite to each other. Each of the at least two slots is curved and extends along a portion of an outer circumference of the body.

18 Claims, 9 Drawing Sheets

//www.w3.org/1999/xhtml">
BRAKE ASSEMBLY FOR FALL ARREST SYSTEM

TECHNOLOGICAL FIELD

Example embodiments of the present disclosure relate generally to fall arrest systems, and more particularly, to a brake assembly of a fall arrest system for protecting users during a fall.

BACKGROUND

Generally, fall arrest systems are used by users working at heights, such as construction sites, buildings, and rescue services, to protect the users during a fall. The fall arrest systems comprise Self-Retracting Lanyard (SRL) systems having a lanyard that is attached to a user. Such lanyard systems are anchored to a fixed member to provide support to a user during the fall.

The lanyard systems have a rotatable component upon which the lanyard is wrapped. When the lanyard extends or contracts based on movement of a user, the rotatable component rotates in a clockwise or a counter-clockwise direction. The lanyard systems also have a mechanical lock that is activated when the user falls. After activation, the mechanical lock restricts rotation of the rotatable component and downward movement of the lanyard. However, the mechanical locks and energy absorption are not efficient in restricting the movement of the lanyard due to force exerted on the locks by downward movement of the lanyard. Thus, the fall arrest systems are inefficient in protecting users during the fall.

BRIEF SUMMARY

The illustrative embodiments of the present disclosure relate to a brake assembly for a fall arrest system. The brake assembly comprises a brake plate having a body. The body has a central opening, where the central opening defines an inner circumference of the body. Further, the brake plate comprises at least two slots on the body, where the at least two slots are disposed diametrically opposite to each other. Each of the at least two slots is disposed between the inner circumference and an outer circumference of the body, and each of the at least two slots is curved and extends along a portion of the outer circumference.

In an example embodiment, the brake plate comprises a plurality of ratchet gear teeth disposed along the inner circumference of the body.

In an example embodiment, each of the plurality of ratchet gear teeth comprises a ramped surface, such that a lower portion of the ramped surface of a ratchet gear tooth abuts a higher portion of the ramped surface of a subsequent ratchet gear tooth.

In an example embodiment, the brake plate further comprises at least two pin openings positioned diametrically opposite to each other, where a pin opening is configured to receive a pin.

In an example embodiment, the brake plate is coupled to a back plate of a brake assembly.

In an example embodiment, a brake assembly for a fall arrest system is disclosed. The brake assembly comprises a brake plate having a central opening, where the central opening defines an inner circumference of the brake plate. The brake plate comprises at least one slot, where the at least one slot is disposed between the inner circumference and an outer circumference of the brake plate. The at least one slot is curved and extends along a portion of the outer circumference. Further, the brake plate has at least one deformable body. The at least one deformable body is disposed within the at least one slot, where the at least one deformable body is curved and extends along a length of the at least one slot.

In an example embodiment, the brake assembly further comprises at least one screw, disposed at a first end of the at least one slot, such that in an instance when the brake plate rotates, a second end of the at least one slot moves towards the at least one screw.

In an example embodiment, the brake assembly further comprises a back plate defining at least one screw hole to receive the at least one screw.

In some embodiments, the back plate further comprises a pin hole to receive a pin for securing the brake plate to the back plate.

In an example embodiment, the pin is composed of aluminum.

In some embodiments, the brake assembly further comprises a plurality of ratchet gear teeth disposed along the inner circumference of the brake plate.

In an example embodiment, the brake assembly comprises a pawl and spring assembly disposed within the central opening of the brake plate, wherein in an instance a user falls, a spring is released, and a pawl engages with the plurality of ratchet gear teeth of the brake plate.

In an example embodiment, each of the plurality of ratchet gear teeth comprises a ramped surface, such that a lower portion of the ramped surface of a ratchet gear tooth abuts a higher portion of the ramped surface of a subsequent ratchet gear tooth.

In an example embodiment, the at least one deformable body is a plastic body.

In an example embodiment, a fall arrest system comprises a back plate, at least one screw, and a brake plate. The at least one screw secures the brake plate to the back plate, wherein the brake plate rotates with reference to the back plate in an instance when a user falls, the brake plate defining a central opening, and wherein the central opening defines an inner circumference of the brake plate. The brake plate comprises at least one slot extending along a portion of an outer circumference of the brake plate wherein the at least one screw is disposed within the at least one slot. The fall arrest system comprises a deformable body disposed within the at least one slot, wherein the at least one screw abuts an end of the deformable body, such that in an instance when the brake plate rotates, the at least one screw exerts a force on the deformable body in a direction opposite to a direction of rotation of the brake plate.

In some embodiments, the deformable body is a single body of a plastic material.

In various embodiments, the fall arrest system further comprises a plurality of ratchet gear teeth disposed along the inner circumference.

In an example embodiment, each of the plurality of ratchet gear teeth comprises a ramped surface, such that a lower portion of the ramped surface of a ratchet gear tooth abuts a higher portion of the ramped surface of a subsequent ratchet gear tooth.

In an example embodiment, the back plate comprises at least one pawl and spring assembly, wherein in an instance a user falls, a spring is released, and a pawl engages with the plurality of ratchet gear teeth of the brake plate.

In an example embodiment, the at least one slot has a curved shape.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
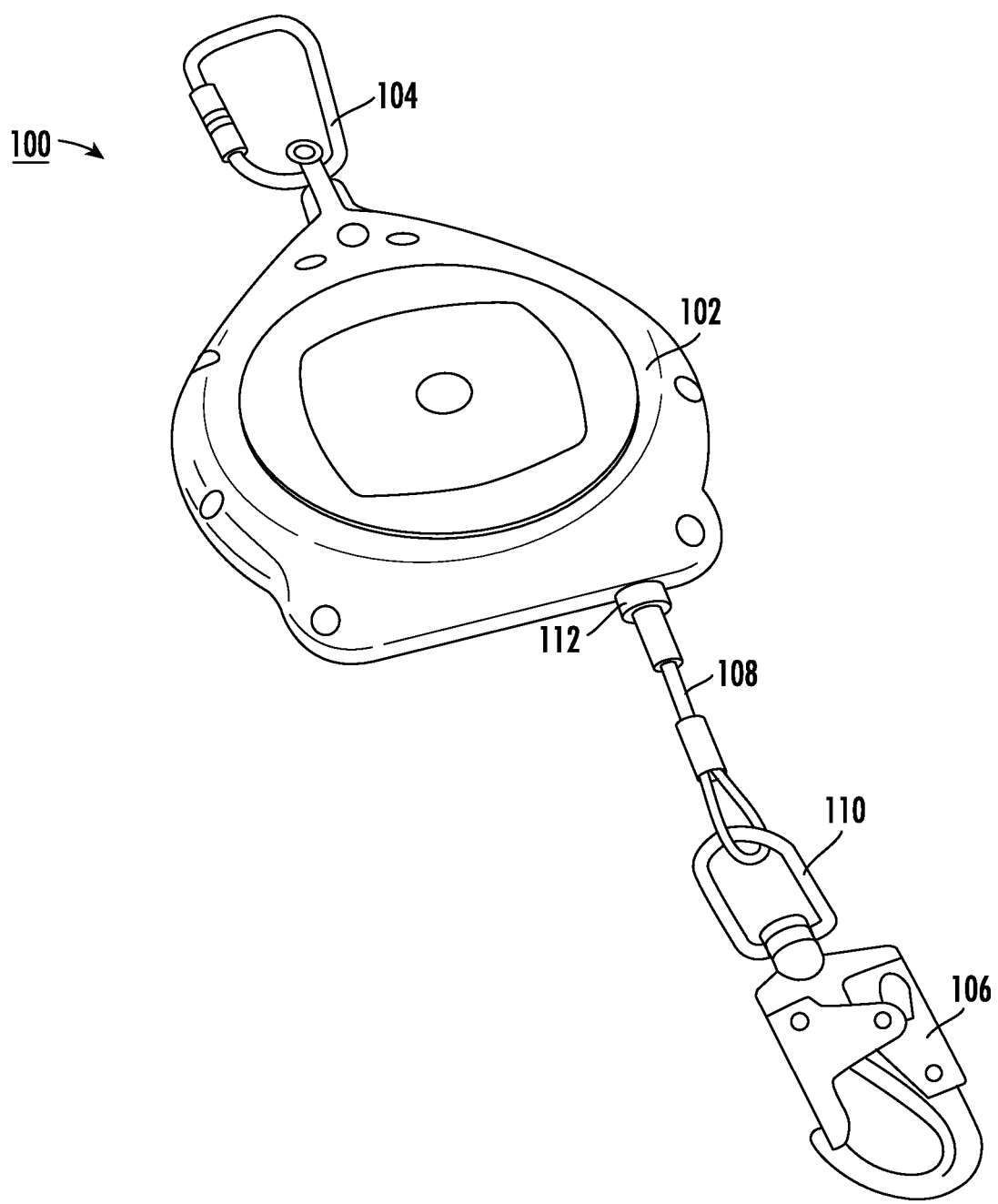
FIG. 1 illustrates a Self-Retracting Lanyard (SRL) of a fall arrest system, in accordance with an example embodiment of the present disclosure.

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

In many working environments, such as ship building, construction, heavy industry engineering industry, power industry, and forestry, users work at height. Such users are equipped with harnesses and fall arrest systems having belts and lanyards that are wrapped around a user for protecting against a fall. Such fall arrest systems have brake assemblies that restrict motion of the belts or the lanyard during the fall. However, with the increasing rotational force and motion of a belt and a lanyard during the fall, the brake assemblies snap and fail to restrict the motion of the moving lanyard. To this end, some existing brake assemblies are not efficient in protecting the user during the fall.

Various example embodiments described in the present disclosure relate to a brake plate and a brake assembly of a fall arrest system for protecting a user during a fall. The brake plate has a circular body that is rotatable along a rotational axis. The brake plate has a central opening that defines an inner circumference of the brake plate. A plurality of ratchet gear teeth is disposed along the inner circumference of the brake plate. The brake plate has at least two slots which are disposed diametrically opposite to each other. In an example, the slots have a curved shape and extend along a portion of an outer circumference of the brake plate. The slots are such that when the brake plate is coupled to a back plate of the brake assembly, a deformable body is disposed within each slot.

The brake assembly has the brake plate coupled to the back plate. The back plate is a stationary component to which the brake plate is secured using two pins and two screws. The brake plate rotates with reference to the back plate. The two pins and the two screws are positioned diametrically opposite to each other. In an example, the screws are disposed within a portion of the slot of the brake plate. In an example, the back plate has a pawl and a spring assembly that is engaged with the plurality of ratchet gear teeth of the brake plate. In an assembled state, the deformable body is within the slots of the back plate such that one end of the deformable body abuts one side of the screw. During the fall, the screws apply force on the deformable body to provide additional energy absorption. The brake assembly provides a simple construction using one brake plate to apply the braking. Thus, the brake assembly provides an efficient mechanism to apply brakes on the lanyard and protect the user during the fall.

The details regarding components of the brake assembly and fall arrest system are described in detail with reference to the figures and subsequent description.

The components illustrated in the figures represent components that may or may not be present in various example embodiments described herein such that embodiments may include fewer or more components than those shown in the figures while not departing from the scope of the disclosure.

Turning now to the drawings, the detailed description set forth below in connection with the appended drawings is intended as a description of various example configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

FIG. 1 illustrates a Self-Retracting Lanyard (SRL) of a fall arrest system, in accordance with an example embodiment of the present disclosure. As shown, an SRL 100 has a body 102, a top end having a D-clip 104, a snap hook 106 and a retractable lanyard 108. In an example, the snap hook 106 is connected to the retractable lanyard 108 through a connector 110. The body 102, in one example, is a plastic body that encases inner components of the SRL 100, for instance, a brake plate and a back plate. The body 102 can be of a shape as shown in the figure or any other shape other than shown in the figure, such as circular or rectangular. In one example, the body 102 has a top plate and a bottom plate, wherein the top plate is coupled to the bottom plate using screws or any type of fasteners.

In another example, the body 102 may be a single unit molded as one piece. The D-clip 104, also referred to as a carabiner, is attached to a top end of the body 102. The shape and size of the D-clip 104 can be based on various parameters, such as weight of the user and or the height at which the user is working. For instance, the D-Clip 104 can be designed to be of a size relatively larger than a usual size of D-clips, in an instance when the SRL 100 is designed for users with higher weights. Further, the D-clip 104 can be of a size smaller than a usual size of D-clips for users having lesser weights. In an example, there can be any other hook, such as snap hook instead of D-clip 104 connected to the top end of the body 102. The D-clip 104 is configured to connect to a fixed body or a support when the user is working at height. The D-clip 104 is also known as an anchorage or anchor that is connected to a fixed member to provide support to the user during a fall.

The snap hook 106 is connected to the retractable lanyard 108 through the connector 110. The snap hook 106 is coupled to a harness of the user. The retractable lanyard 108 is coiled within the body 102 of the SRL 100 and releases when the lanyard 108 is attached to a load and retracts to its original position when the load is removed. In one example, the body 102 has an opening 112 for passage of the retractable lanyard 108.

Figure 3:
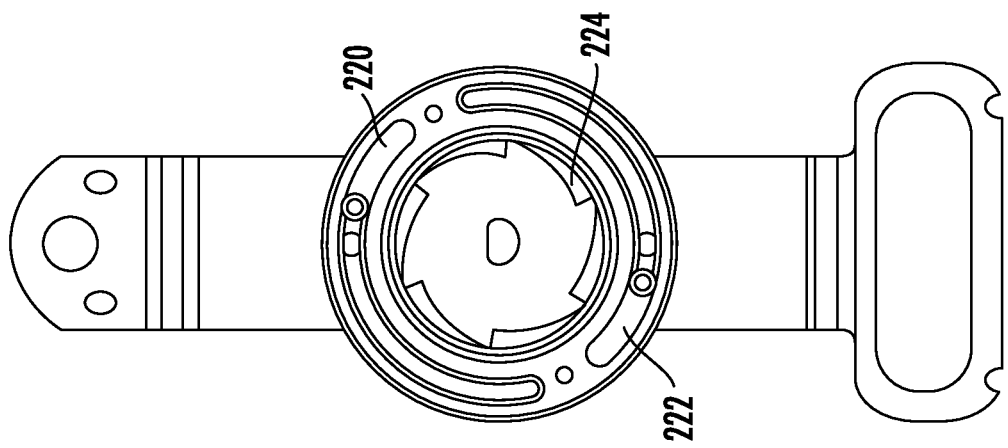
FIGS. 2 and 3 illustrate operation of a brake assembly of an SRL, in accordance with an example embodiment of the present disclosure.
Figure 2:
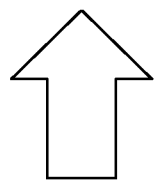
Figure 2:
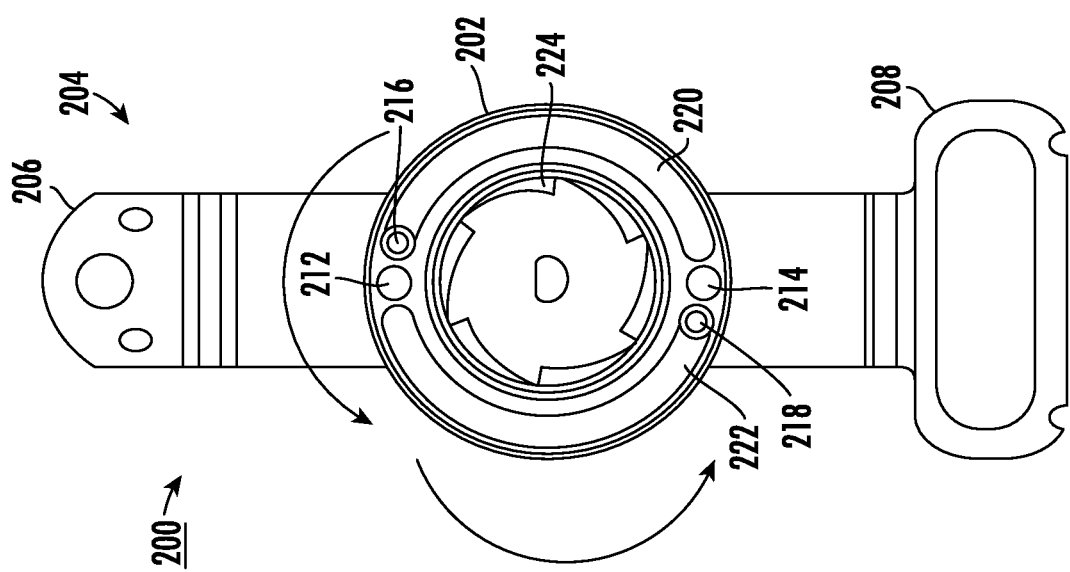

FIGS. 2 and 3 illustrate operation of a brake assembly 200, in accordance with an example embodiment of the present disclosure. The brake assembly 200 is housed within the body 102 as shown in FIG. 1. The brake assembly 200 comprises a brake plate 202, and a back plate 204. The back plate 204 has a top portion 206, a bottom portion 208 and a center portion 210 shown in FIG. 5.

The top portion 206, as shown, has holes to receive pins. The pins secure the back plate 204 to the body 102 of the SRL 100 from inside. The bottom portion 208 is also coupled to the body 102 from inside.

The center portion 210 has two pin holes and two screw holes, described in detail with reference to subsequent figures. Each of the pin holes is configured to receive a pin in an assembled state when the brake plate 202 is coupled to the back plate 204. As shown, the pin holes receive pins 212 and 214. The pin 212 is received into the top pin hole and the pin 214 is received into the bottom pin hole. Each of the screw holes is configured to receive a screw in the assembled state. Screws 216 and 218 are received into the screw holes. The pins 212 and 214 secure the brake plate 202 to the back plate 204. The screws 216 and 218 secure the brake plate 202 to the back plate 204. The screw 216 is received into the top screw hole and the screw 218 into the bottom screw hole. In an example, the screw 216 is disposed in a slot of the brake plate 202 with a deformable body 220, such that one side of the screw 216 abuts one end of the deformable body 220. The screw 218 is positioned within another slot of the brake plate 202 abutting another deformable body 222. The brake plate 202 comprises a plurality of ratchet gear teeth 224 at the center.

Figure 4:
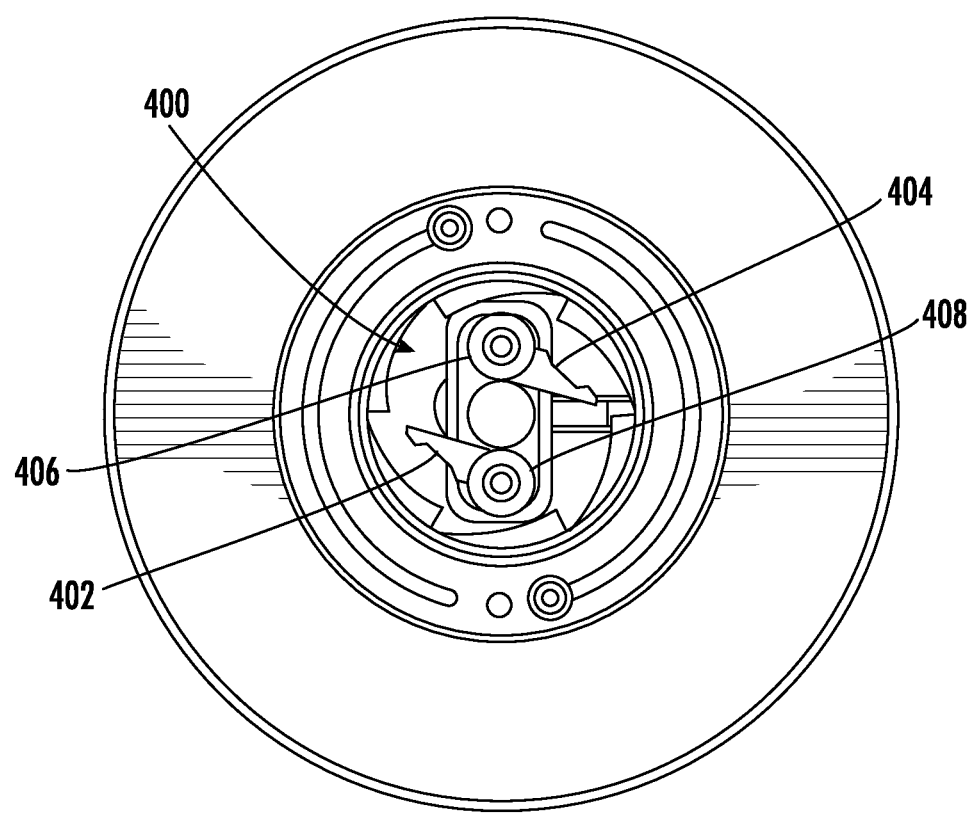
FIG. 4 illustrates a pawl and a spring assembly of an SRL, in accordance with an example embodiment of the present disclosure.

FIG. 2 illustrates the brake assembly 200 before a fall of a user and FIG. 3 illustrates the brake assembly 200 after the fall has occurred and the braking has been applied. As shown in FIG. 2, the brake plate 202 is in its original position. The rotation of the lanyard applies a force on the brake plate 202 to rotate in one direction, for instance counterclockwise, as shown. The rotation of the lanyard also activates a pawl and spring assembly 400, described in detail with reference to FIG. 4. As shown in FIG. 4, the pawl and spring assembly 400 comprises pawls 402 and 404 and springs 406 and 408. Dimensions of pawls 402 and 404 may be based on configuration and alignment of the pawl and spring assembly 400. For instance, length of each of the pawls 402 and 404 may be based on a gap between the pawls 402 and 404 and the plurality of ratchet gear teeth 224. In another example, width and thickness of the pawls 402 and 404 may be based on the pressure bearing capacity of the pawls 402 and 404. For higher pressure bearing capacity, the width and thickness of the pawls 402 and 404 may be higher and for lower pressure bearing capacity the thickness and width of the pawls 402 and 404 may be reduced. The pawls 402 and 404 are configured to engage with the plurality of ratchet gear teeth 224 of the brake plate 202. The pawls 402 and 404 are in a first position when the pawls 402 and 404 are held by the springs 406 and 408. The spring 406 holds the pawl 402 and the spring 408 retains the pawl 404 in the first position.

In an example, one end of the spring 406 is coupled to an end of the pawl 402 and another end of the spring 406 is coupled to a fixed member of the pawl and spring assembly 400. The spring 406 is coupled to the end of the pawl 402 such that during the fall, the pawl 402 is released from the spring 406. In another example, one end of the spring 408 is coupled to an end of the pawl 404 and another end of the spring 408 is coupled to a fixed member of the pawl and spring assembly 400. The spring 408 is coupled to the end of the pawl 404 such that during the fall, the pawl 404 is released from the spring 408.

The springs 406 and 408 hold the pawls 402 and 404 in a first position, as shown. In the first position, the springs 406 and 408 retain the pawls 402 and 404. The pawls 402 and 404 move to a second position when the springs 406 and 408 are released. In the second position, the pawls 402 and 404 are engaged with the plurality of ratchet gear teeth 224. For instance, the end of each of the pawls 402 and 404 abuts a tooth from amongst the plurality of ratchet gear teeth 224. The engagement of the pawls 402 and 404 with the tooth prevents further rotation of the brake plate 202. However, with the increasing force applied on the pawls 402 and 404 due to the rotating lanyard, the pawls 402 and 404 resist the motion of the brake plate 202 to a threshold point and snap after the force increases above the threshold point.

Referring to FIGS. 2 and 3, after the fall, rotation of the lanyard activates the pawl and spring assembly 400, which in turn releases the springs 406 and 408. The release of the springs 406 and 408 switches the pawls 402 and 404 to move from the first position to the second position to engage with the plurality of ratchet gear teeth 224. In the engaged position, the pawls 402 and 404 restrict the rotation of the brake plate 202 in the counterclockwise direction. With increasing rotational force of the lanyard, the pawl and spring assembly 400 snaps. After breaking of the pawl and spring assembly 400, the entire pressure of the rotating lanyard is exerted on the pins 212 and 214.

The pins 212 and 214 restrict the rotation of the brake plate 202 in the counter-clockwise direction and bear the pressure momentarily and, owing to increasing pressure of the rotating lanyard, break apart. Thereafter, the force is applied on the screws 216 and 218. The rotation of the brake plate 202 causes the screws 216 and 218 to apply the force on the deformable bodies 220 and 222. For instance, the screw 216 applies force on the deformable body 220. In an instance, the force applied by the screw 216 on the deformable body 220 is in a direction opposite to the rotational force of the lanyard. The screw 218 applies force on the deformable body 222 in a clockwise direction. It may be understood that the screws 216 and 218 are composed of a durable material, such as steel, and are unlikely to break due to the force applied and rather transfer the force on the deformable bodies 220 and 222. Due to application of force, the deformable bodies 220 and 222 crush and deform within the respective slots. The crushed and deformed deformable bodies 220 and 222 are shown in FIG. 3. The crushing and deforming of the deformable bodies 220 and 222 absorb the energy during resistance of motion of the brake plate 202. Thus, the brake assembly 200 provides an efficient mechanism to apply brakes on the lanyard and protect the user during the fall. The brake assembly 200 also provides a simple construction using one brake plate, such as the brake plate 202, to apply the braking mechanism.

Figure 5:
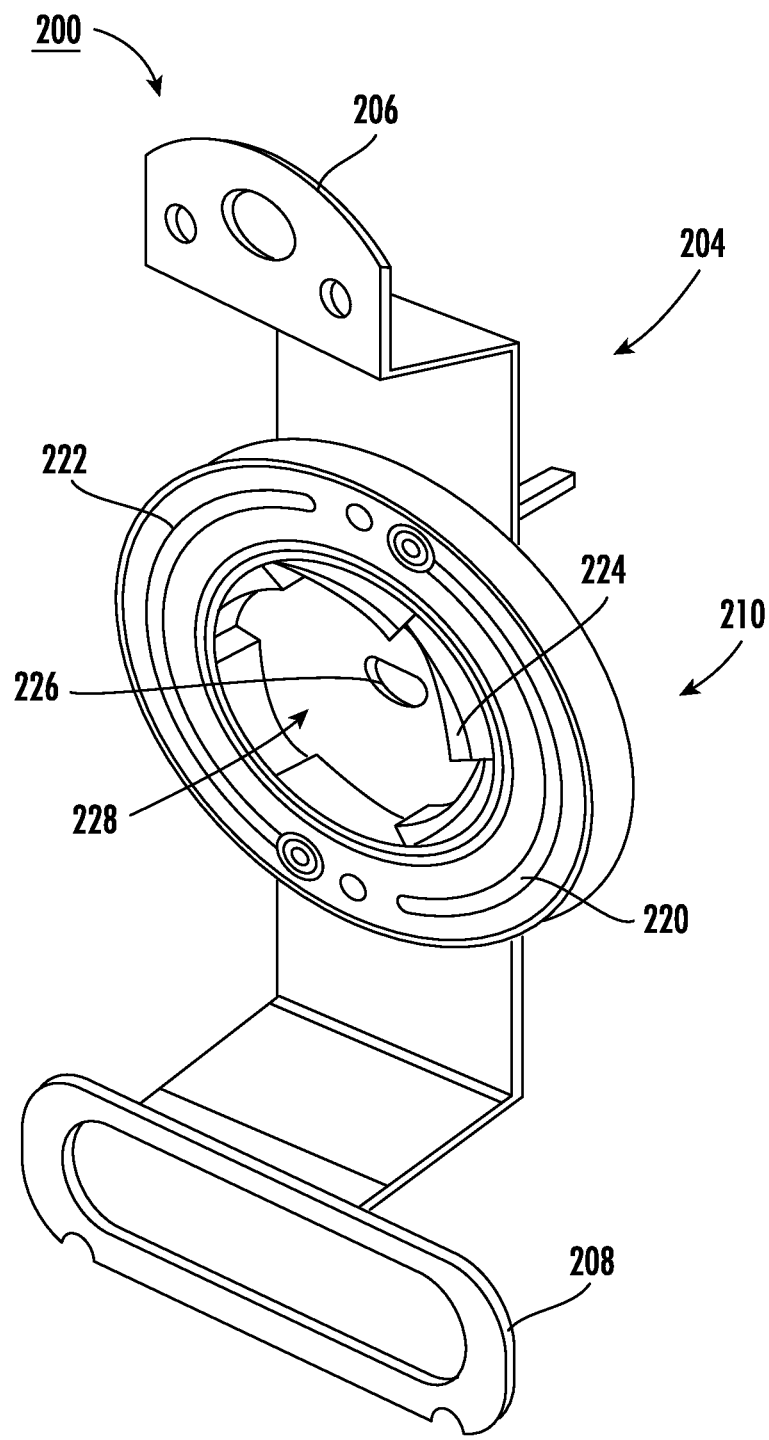
FIG. 5 illustrates a brake assembly of an SRL of a fall arrest system, in accordance with an example embodiment of the present disclosure.

FIG. 5 illustrates an external view of the brake assembly 200, in accordance with an example embodiment of the present disclosure. As described previously, the back plate 204 has the top portion 206, the bottom portion 208 and the center portion 210. The center portion 210 has a circular shape. Although shown as circular, the center portion 210 may have other shapes based on the shape of the body 102 of the SRL 100. In one example, the shape and size of the center portion 210 may also vary based on shape and size of the brake plate 202. If the size of the brake plate 202 is large, then the size of the center portion 210 may also be large. As shown in FIG. 5, the center portion 210 also has a center hole 226. The center hole 226 is configured to receive the pawl and spring assembly 400. The center hole 216 has a circular shape with one straight side to engage the pawl and spring assembly 400.

The brake plate 202 is circular in shape and has a predefined thickness. The brake plate 202 has a central opening 228. A plurality of ratchet gear teeth 224 is disposed along the central opening 228 of the brake plate 202. In an example, the plurality of ratchet gear teeth 224 is disposed in a circular shape along an inner circumference of the brake plate 202. A tooth of the plurality of ratchet gear teeth 224 comprises a ramped surface, such that a lower portion of the ramped surface of a ratchet gear tooth abuts a higher portion of the ramped surface of a subsequent ratchet gear tooth. In the assembled state, the plurality of ratchet gear teeth 224 is configured to engage with the pawl of the pawl and spring assembly 400.

The brake plate 202 has two pin openings, described in detail with reference to FIGS. 7-9. In an example embodiment of the present disclosure, the two pin openings are disposed opposite to each other. In an example, the two pin openings are positioned such that a top pin opening is straight at the top of the central opening 228 and another pin opening is straight below the central opening 228. In the assembled state, the top pin opening is aligned with the top pin hole and the bottom pin opening is aligned with the bottom pin hole, such that a pin passes through the top pin opening into the top pin hole and another pin passes through the bottom pin opening into the bottom pin hole.

The brake plate 202 also has two slots, described with reference to FIGS. 7-9, that are disposed opposite to each other. The slots extend along a portion of an outer circumference of the brake plate 202. In the assembled state, these slots are configured to receive a deformable body, such as the deformable bodies 220 and 222. The deformable bodies 220 and 222, as described earlier, absorb energy during braking by the brake assembly 200 to restrict rotation of the lanyard during the fall. In an example, each slot is aligned with the screw holes of the center portion 210 of the back plate 204, such that screws 216 and 218 pass through the slots into the screw holes. The details of components of the brake assembly 200 is further described with reference to FIG. 6.

Figure 6:
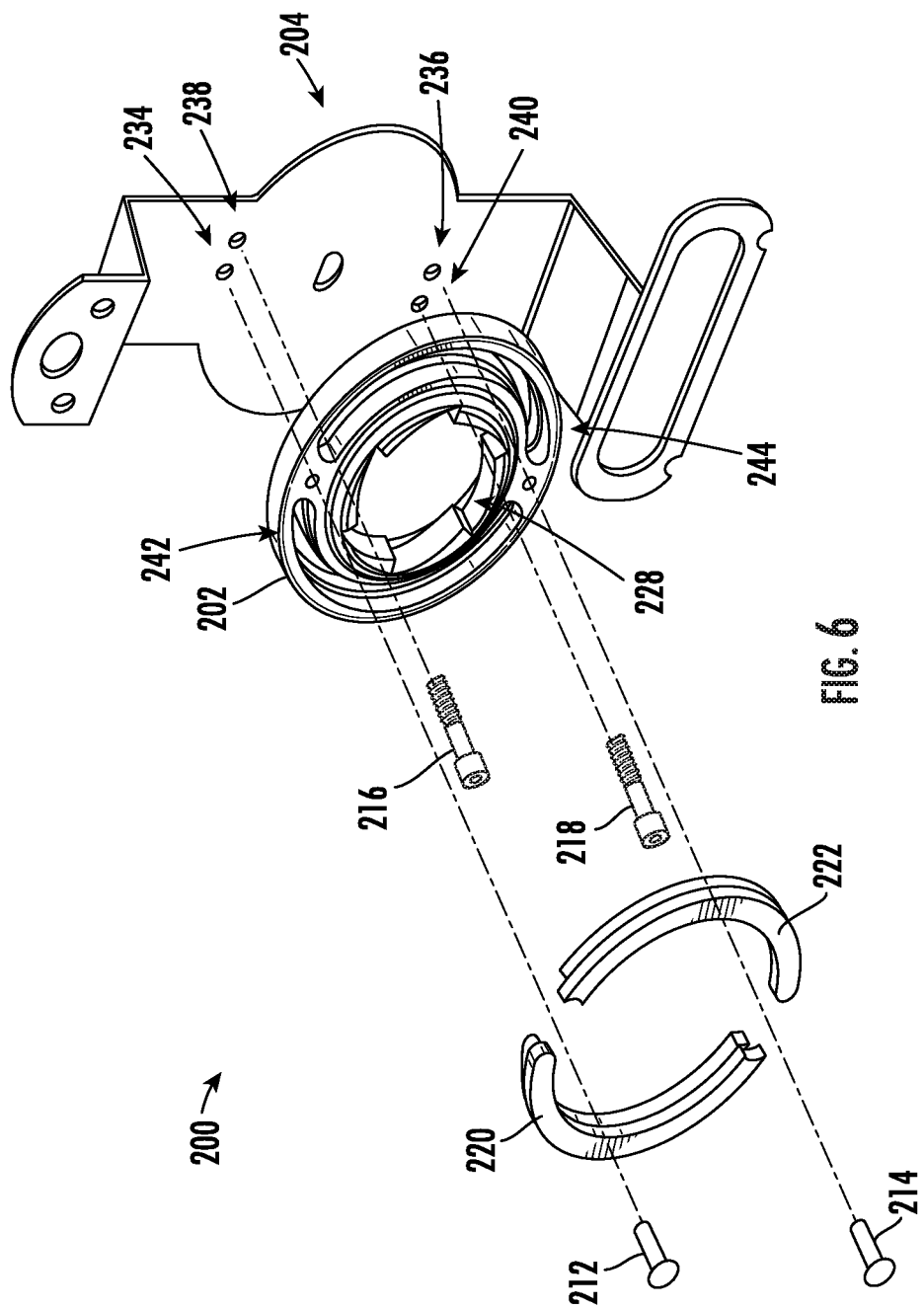
FIG. 6 is an exploded view of a brake assembly of a fall arrest system, in accordance with an example embodiment of the present disclosure.

FIG. 6 illustrates an exploded view of the brake assembly 200, in accordance with an example embodiment of the present disclosure. The brake assembly 200 comprises the brake plate 202, the back plate 204, the screws 216 and 218 and the deformable bodies 220 and 222. Further, the brake assembly 200 comprises pins 212 and 214.

The back plate 204 has pin holes 234 and 236, and screw holes 238 and 240. The pin holes 234 and 236 are positioned on opposite sides and the screw holes 238 and 240 are disposed along the opposite direction in the center portion 210. The brake plate 202 has the pin openings disposed diametrically opposite to each other. The brake plate also includes a pair of slots 242 and 244. Slots 242 and 244 are curved in shape and extend along a portion of the outer circumference of the brake plate 202. The screws 216 and 218 in one example are steel screws that are mounted to the brake plate 202 and the back plate 204. The screws 216 and 218 secure the brake plate 202 to the back plate 204 and aid in restricting movement of the lanyard during the fall.

As shown in FIG. 6, in the assembled state, the screw 216 passes through the slot 242 to enter the screw hole 238. The screw 218 passes through the slot 244 and is inserted into the screw hole 240. The screws 216 and 218 are aligned such that the brake plate 202 can rotate along the screws 216 and 218 within the respective slots 242 and 244 when braking is applied by the brake assembly 200.

In an example, the slots 242 and 244 are configured to receive deformable bodies 220 and 222. The deformable bodies 220 and 222 are plastic spacers in one example. The deformable bodies 220 and 222 are curved shaped plastic bodies that are inserted into the slots 242 and 244. In one example, these deformable bodies 220 and 222 are a single piece of plastic. In another example the deformable bodies 220 and 222 may have multiple pieces of plastic stacked into the slots 242 and 244. During operation, the deformable bodies 220 and 222 absorb force exerted by the screws 216 and 218 to restrict motion of the lanyard during the fall. During energy absorption, the deformable bodies 220 and 222 are crushed and deformed.

In an example, the pins 212 and 214 are plastic or aluminum pins. In the assembled state, the pins 212 and 214 secure the brake plate 202 to the back plate 204. As shown in FIG. 6, the pin 212 passes through a pin opening into the pin hole 234 and the pin 214 passes through another pin opening into the pin hole 236. In the assembled state, the back plate 204 is coupled to the body 102 of the SRL 100 from inside. Further, the brake plate 202 and the back plate 204 are aligned such that the center hole 226 is positioned along the center axis of the central opening 228. In the assembled state, the screw 216 is placed adjacent to the pin 212 and the screw 218 is positioned adjacent to the pin 214.

In an example, the screws 216 and 218 are composed of a durable material, such as stainless steel, to bear the pressure on the screws applied by the rotating lanyard when the user falls. As shown, there are two screws 216 and 218 used in the brake assembly 200; however, there may be a greater number of screws used in the brake assembly 200 based on use or requirement of the SRL 100. The screws 216 and 218 are used to assemble objects, such as the brake plate 202 and the back plate 204 with threads. Examples of the screws 216 and 218 include chipboard screws, particle board screws, deck screws, drive screws, hammer drive screws, drywall screws, eye screws, dowel screws, wood screws, twin fast screws, security head screws and sheet metal screws. Some of the different head shapes in which the screws are available include pan, button, round, mushroom, oval, bulge, cheese, fillister and flanged.

The pins 212 and 214 can be mounting pins or bolts. The pins 212 and 214 are composed of aluminum. In alternative embodiments, the pins 212 and 214 can be anchor bolts, arbor bolts, elevator bolts, hanger bolts, hex bolts, J bolts, lag bolts, rock bolts, shoulder bolts and U bolts. Additionally, bolts are available in a wide range of materials, including steel, stainless steel, bronze, brass and nylon.

Figure 7:
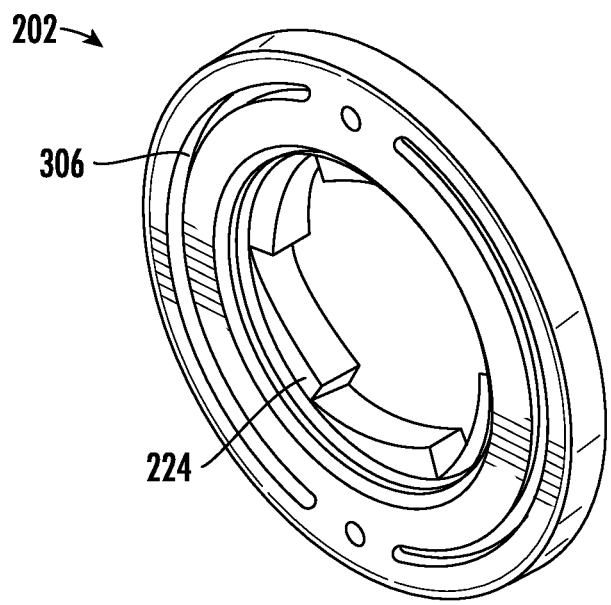
FIGS. 7-9 illustrate various views of a brake plate of a fall arrest system, in accordance with an example embodiment of the present disclosure.
Figure 8:
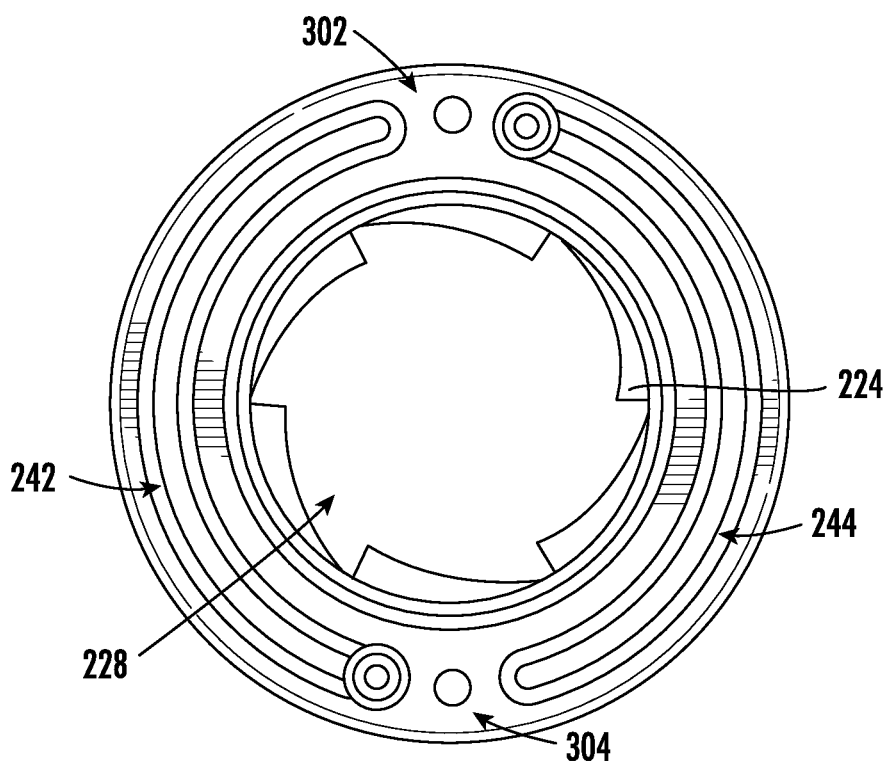
Figure 9:
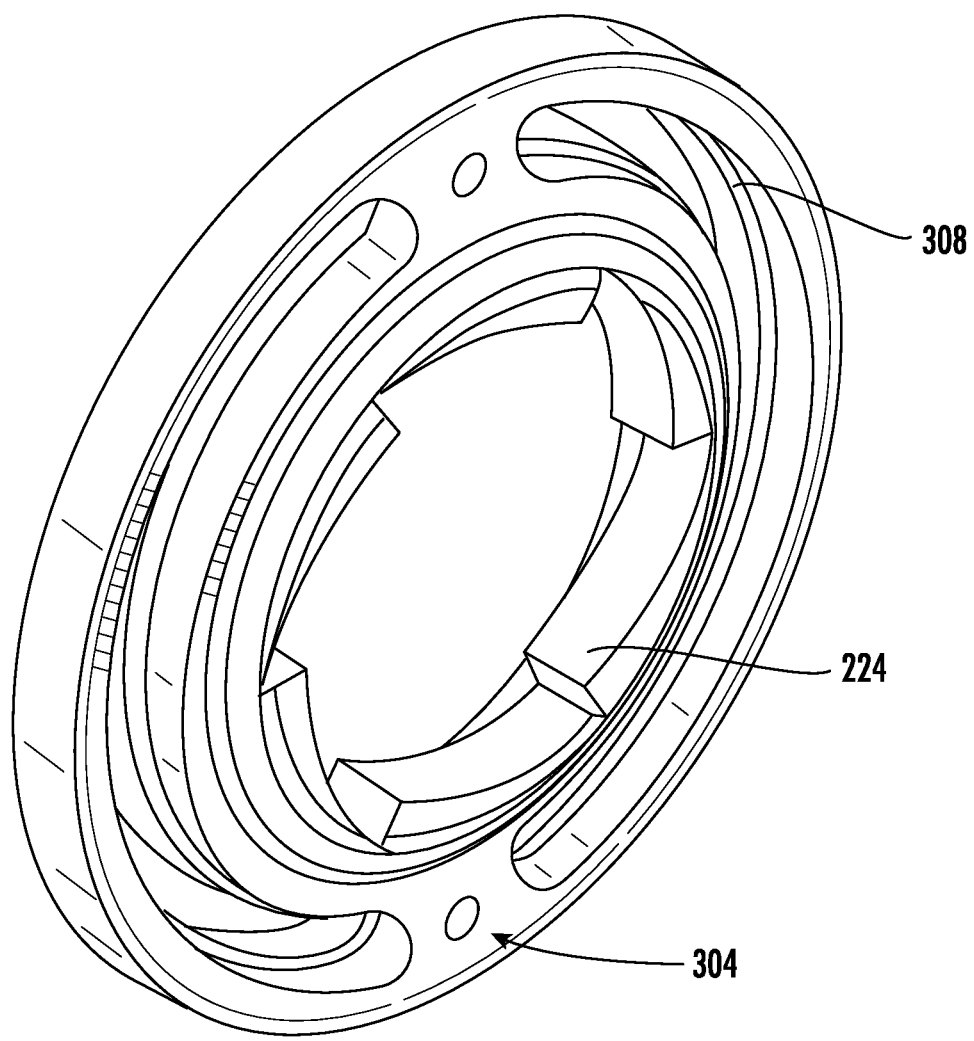

FIGS. 7-9 illustrate various views of the brake plate 202 of the SRL 100, in accordance with an example embodiment of the present disclosure. As described, the brake plate 202 is circular in shape. The size and thickness of the brake plate 202 is predefined. In an example, the brake plate 202 has a standard thickness used in self retracting lanyards. The brake plate 202 has the central opening 228 and the plurality of ratchet gear teeth 224 disposed along the central opening 228 of the brake plate 202. The plurality of ratchet gear teeth 224 is disposed in a circular shape along the inner circumference of the brake plate 202. In an example, the plurality of ratchet gear teeth 224 is disposed such that each tooth of the plurality of ratchet gear teeth 224 comprises a ramped surface, and a lower portion of the ramped surface of a ratchet gear tooth abuts the higher portion of the ramped surface of the subsequent ratchet gear tooth. In the assembled state, the plurality of ratchet gear teeth 224 is configured to engage with the pawls 402 and 404 of the pawl and spring assembly 400.

The brake plate 202 has two pin openings 302 and 304. The two pin openings 302 and 304 are disposed opposite to each other. In an example, the two pin openings 302 and 304 are positioned such that the pin opening 302 is straight at the top of the central opening 228 and the pin opening 304 is straight below the central opening 228. In the assembled state, the pin opening 302 is aligned with the pin hole 234 and the pin opening 304 is aligned with the pin hole 236, such that a pin passes through the pin opening 302 into the pin hole 234 and another pin passes through the pin opening 304 into the pin hole 236.

The two slots 242 and 244 are disposed opposite to each other. The slots 242 and 244 are curved and extend along a portion of the outer circumference of the brake plate 202. In the assembled state, these slots 242 and 244 are configured to receive deformable bodies 220 and 222. The deformable bodies 220 and 222 absorb energy during braking operation by the brake assembly 200 to restrict rotation of the lanyard during the fall. For instance, the deformable body 220 absorbs energy corresponding to force exerted by the screw 218 and the deformable body 222 absorbs energy corresponding to force exerted by the screw 216.

In an example, the slot 242 is aligned with the screw hole 240 and the slot 244 is aligned with the screw hole 238. The screw 218 passes through a portion of the slot 242 and is received by the screw hole 240. The screw 218 passes through one end of the slot 242 and the deformable body 220 is fitted into the slot 242 such that one side of the screw 218 abuts a first end of the slot 242 and another side of the screw 218 abuts one end of the deformable body 220. In a similar manner, the screw 216 passes through a portion of the slot 244 and is received by the screw hole 238. The screw 216 passes through one end of the slot 244 and the deformable body 222 is also fitted into the slot 244 such that one side of the screw 216 abuts a first end of the slot 244 and another side of the screw 216 abuts one end of the deformable body 222. The slots 242 and 244 have steps 306 and 308 within the slots. The steps 306 and 308 are raised surfaces having a predefined thickness that extend along the length of the slots 242 and 244. In an example, the steps 306 and 308 provide ease of fitting for instance snap-fitting of the deformable bodies 220 and 222 into the slots 242 and 244.

Figure 10:
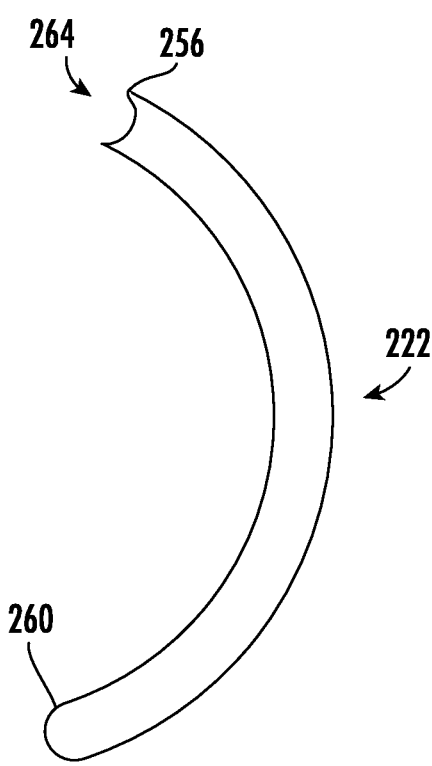
FIGS. 10 and 11 illustrate various views of a deformable body disposed within a slot of a brake plate, in accordance with an example embodiment of the present disclosure.
Figure 11:
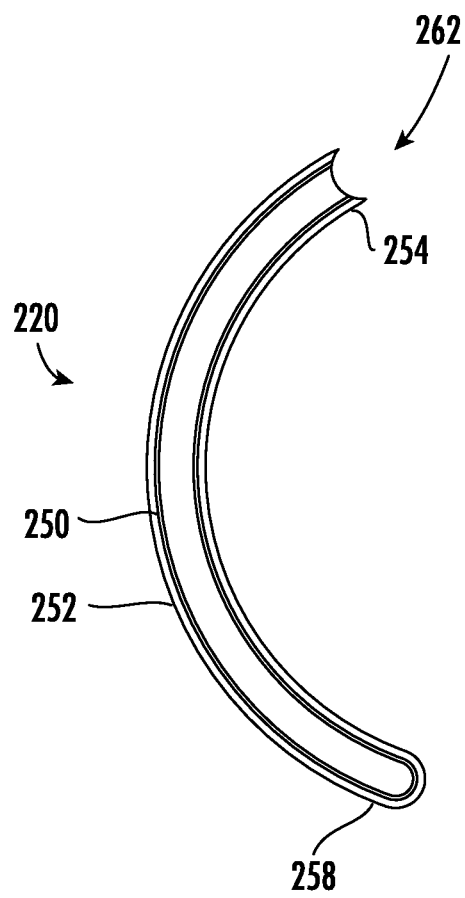

FIGS. 10 and 11 illustrate front and back views of the deformable bodies 220 and 222, in accordance with an example embodiment of the present disclosure. In an example, the deformable bodies 220 and 222, also referred to as spacers, are made of plastic material. There may be different types of plastic materials used for making the deformable bodies 220 and 222. The plastic materials may be selected based on density, stiffness and pressure bearing capacity of the material. For instance, a plastic material with high density and pressure bearing capacity may be selected for enhanced braking of the lanyard. In an example, the material may be one of Ethylene Propylene Diene terpolymer (EPDM), foam, silicon, rubber and alike materials. As shown in FIG. 11, the deformable body 220 has two parts 250 and 252. There may be slight variations in width and length of the parts 250 and 252. Such a configuration of the parts 250 and 252 provides improved fitting of the deformable bodies 220 and 222 into the slots 242 and 244 of the brake plate 202.

The deformable bodies 220 and 222 have two ends, a first end 254 of deformable body 220 and a first end 256 of deformable body 222. Each of the deformable bodies 220 and 222 has a second end 258 and 260. As shown, the second ends 258 and 260 have a round shaped ending and the first ends 254 and 256 have a curved ending 262 and 264. In an example, the first ends 254 and 256 have inward curves. The inward curve provides spacing for the screws 216 and 218 to be accommodated within the slots 242 and 244. In an example, the screws 216 and 218 are fitted into the slots 242 and 244 such that a first side of the screws 216 and 218 abuts one end of the slots 242 and 244 and a second side, opposite to the first side, abuts the curved endings 262 and 264 of the deformable bodies 220 and 222.

Figure 12:
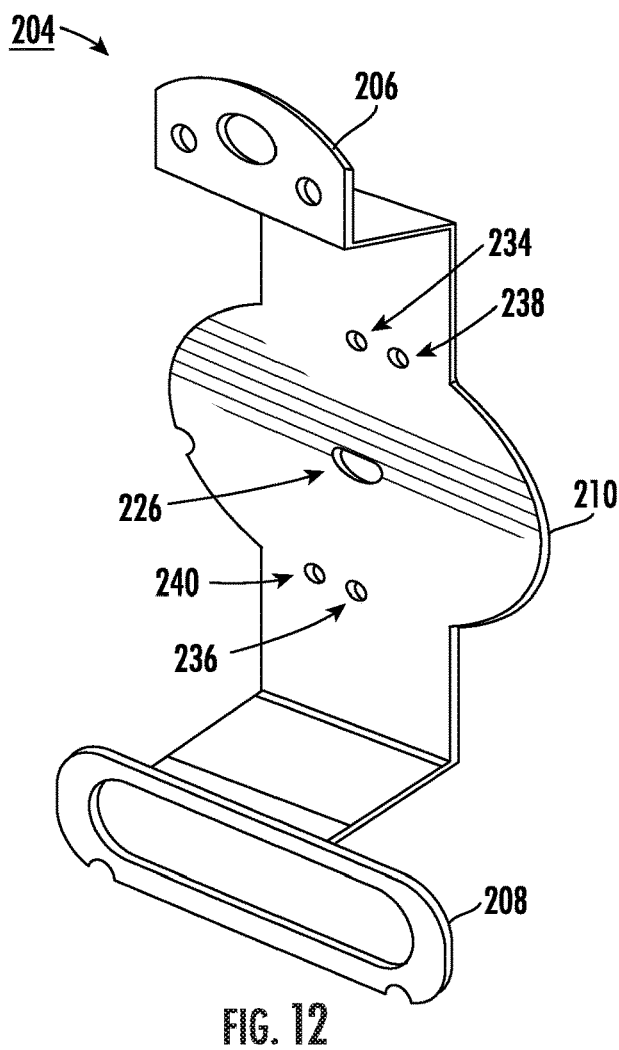
FIGS. 12 and 13 illustrate various views of a back plate of a brake assembly, in accordance with an example embodiment of the present disclosure.
Figure 13:
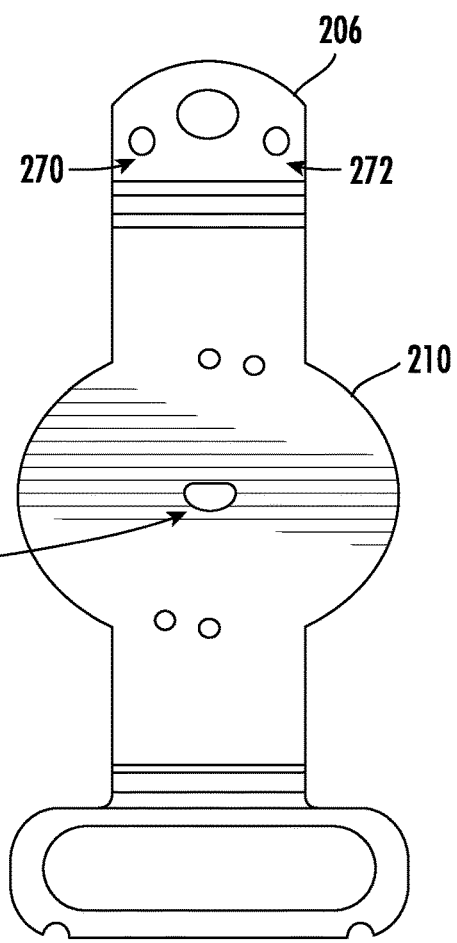

FIGS. 12 and 13 illustrate the back plate 204 of the brake assembly 200, in accordance with an example embodiment of the present disclosure. The top portion 206 of the back plate 204, as shown, has holes 270 and 272 to receive mounting pins. The mounting pins secure the back plate 204 to the body 102 of the SRL 100 from inside. These mounting pins can be bolts that can be directly inserted into the holes 270 and 272 or can have threaded portions to thread mount the pins. The holes 270 and 272 may have varied diameters based on size of the mounting pins to be inserted. The bottom portion 208 is also coupled to the body 102 from inside. As shown, the top portion 206 and the bottom portion 208 extend outwards from the plane of the center portion 210 and are aligned along a common plane that is different from the plane of the center portion 210. The center portion 210 has a circular shape. As described previously, the center portion 210 may have other shapes based on the shape of the body 102 of the SRL 100. The shape and size of the center portion 210 may also vary based on shape and size of the brake plate 202. In an example embodiment, if the size of the brake plate 202 is large, then the size of the center portion 210 may also be large. If the size of the brake plate 202 is small, then the size of the center portion 210 may also be small.

As described previously, the center portion 210 has two pin holes 234 and 236 and two screw holes 238 and 240. Each of the pin holes 234 and 236 is configured to receive a pin, for instance the pins 212 and 214, in an assembled state when the brake plate 202 is coupled to the back plate 204. Each of the screw holes 238 and 240 is configured to receive a screw, for instance one of the screws 216 and 218, in the assembled state. The center portion 210 also has the center hole 226. The center hole 226 is configured to receive the pawl and spring assembly 400. The center hole 226 has a circular shape with one straight side to engage the pawl and spring assembly 400. The two pin holes 234 and 236 are disposed opposite to each other. In an example, the two pin holes 234 and 236 are positioned such that the pin hole 234 is straight at the top of the center hole 226 and the pin hole 236 is straight below the center hole 226. The two pin holes 234 and 236 and the center hole 226 are aligned along a straight line. The screw holes 238 and 240 are also disposed diametrically opposite to each other. In one example, the screw hole 238 is disposed adjacent to the pin hole 234 and the screw hole 240 is disposed adjacent to the pin hole 236.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments, but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present disclosure are disclosed herein; however, it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While it is apparent that the illustrative embodiments herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A brake plate for a fall arrest system, the brake plate comprising:
    a body having a central opening, wherein the central opening defines an inner circumference of the body;
    at least two slots on the body, wherein the at least two slots are disposed diametrically opposite to each other, wherein each of the at least two slots is disposed between the inner circumference and an outer circumference of the body, wherein each of the at least two slots is curved and extends along a portion of the outer circumference; and
    a plurality of ratchet gear teeth disposed along the inner circumference of the body.

2. The brake plate as claimed in claim 1, wherein each of the plurality of ratchet gear teeth comprises a ramped surface, such that a lower portion of the ramped surface of a ratchet gear tooth abuts a higher portion of the ramped surface of a subsequent ratchet gear tooth.

3. The brake plate as claimed in claim 1 further comprising at least two pin openings positioned diametrically opposite to each other, wherein a pin opening is configured to receive a pin.

4. The brake plate as claimed in claim 1, wherein the brake plate is coupled to a back plate of a brake assembly.

5. A brake assembly for a fall arrest system, comprising:
    a brake plate having a central opening, wherein the central opening defines an inner circumference of the brake plate, the brake plate comprising:
        at least one slot, wherein the at least one slot is disposed between the inner circumference and an outer circumference of the brake plate, wherein the at least one slot is curved and extends along a portion of the outer circumference of the brake plate; and
        at least one deformable body, wherein the at least one deformable body is disposed within the at least one slot, wherein the at least one deformable body is curved and extends along a length of the at least one slot; and
    a plurality of ratchet gear teeth disposed along the inner circumference of the brake plate.

6. The brake assembly as claimed in claim 5, further comprising at least one screw, disposed at a first end of the at least one slot, such that in an instance when the brake plate rotates, a second end of the at least one slot moves towards the at least one screw.

7. The brake assembly as claimed in claim 6, further comprising a back plate defining at least one screw hole to receive the at least one screw.

8. The brake assembly as claimed in claim 7, wherein the back plate further comprises a pin hole to receive a pin for securing the brake plate to the back plate.

9. The brake assembly as claimed in claim 8, wherein the pin is composed of aluminum.

10. The brake assembly as claimed in claim 5, further comprising a pawl and spring assembly disposed within the central opening of the brake plate, wherein in an instance a user falls, a spring is released and a pawl engages with the plurality of ratchet gear teeth of the brake plate.

11. The brake assembly as claimed in claim 5, wherein each of the plurality of ratchet gear teeth comprises a ramped surface, such that a lower portion of the ramped surface of a ratchet gear tooth abuts a higher portion of the ramped surface of a subsequent ratchet gear tooth.

12. The brake assembly as claimed in claim 5, wherein the at least one deformable body is a plastic body.

13. A fall arrest system comprising:
    a back plate;
    at least one screw; and
    a brake plate, wherein the at least one screw secures the brake plate to the back plate, wherein the brake plate rotates with reference to the back plate in an instance when a user falls, the brake plate defining a central opening, and wherein the central opening defines an inner circumference of the brake plate, the brake plate comprising:
        at least one slot extending along a portion of an outer circumference of the brake plate, wherein the at least one screw is disposed within the at least one slot; and a deformable body disposed within the at least one slot, wherein the at least one screw abuts an end of the deformable body, such that in an instance when the brake plate rotates, the at least one screw exerts a force on the deformable body in a direction opposite to a direction of rotation of the brake plate.

14. The fall arrest system as claimed in claim 13 wherein the deformable body is a single body of a plastic material.

15. The fall arrest system as claimed in claim 13 further comprising a plurality of ratchet gear teeth disposed along the inner circumference.

16. The fall arrest system as claimed in claim 15 wherein each of the plurality of ratchet gear teeth comprises a ramped surface, such that a lower portion of the ramped surface of a ratchet gear tooth abuts a higher portion of the ramped surface of a subsequent ratchet gear tooth.

17. The fall arrest system as claimed in claim 16, wherein the back plate comprises at least one pawl and spring assembly, wherein in an instance a user falls, a spring is released and a pawl engages with the plurality of ratchet gear teeth of the brake plate.

18. The fall arrest system as claimed in claim 13, wherein the at least one slot has a curved shape.

\* \* \* \* \*